Patented Aug. 23, 1927.

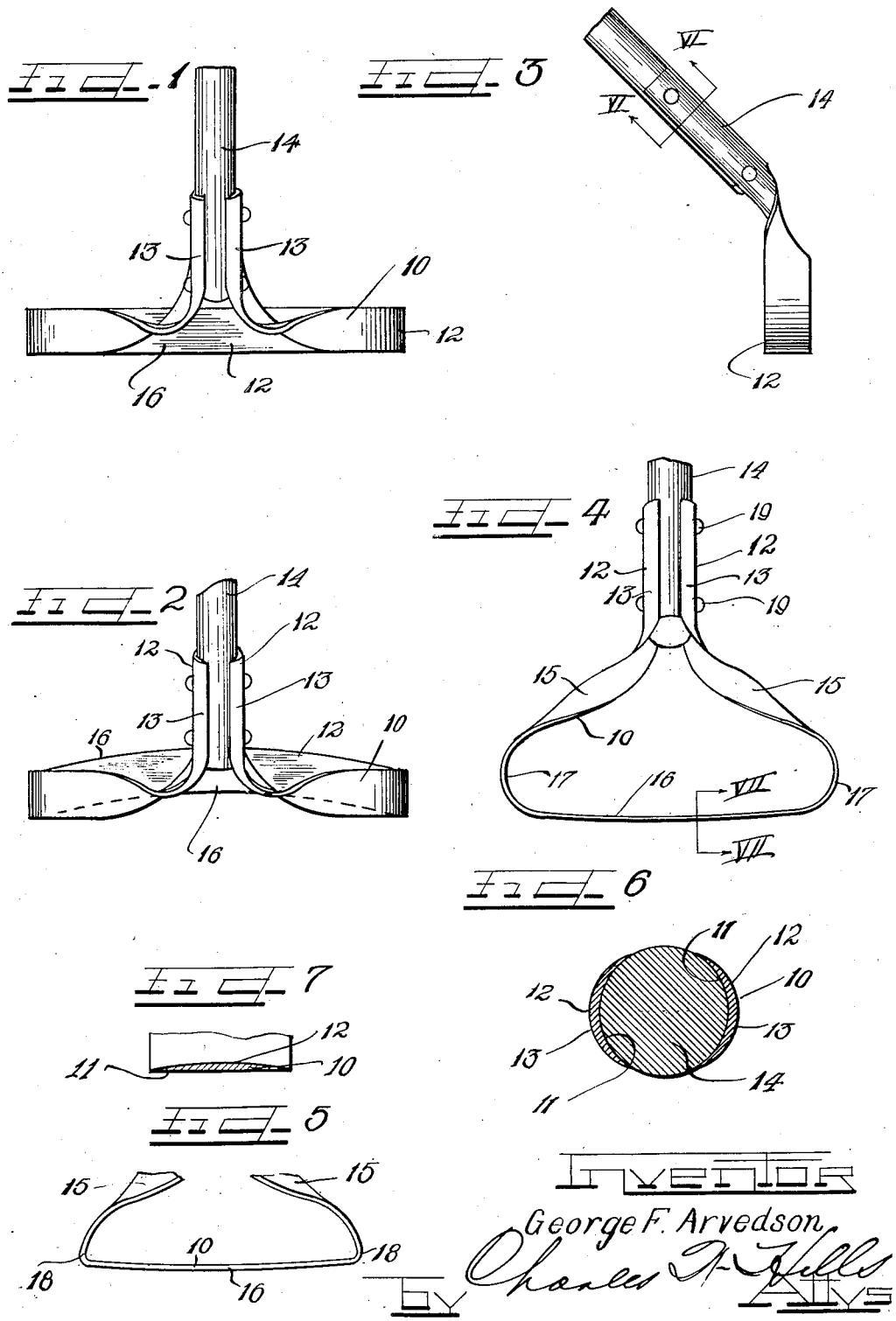

1,639,643

UNITED STATES PATENT OFFICE.

GEORGE F. ARVEDSON, OF CARPENTERSVILLE, ILLINOIS.

GARDEN IMPLEMENT.

Application filed July 17, 1926. Serial No. 123,075.

This invention relates to improvements in garden implements.

One of the objects is to provide a convenient efficient implement, in the nature of a hoe, for general use in a garden, grove and orchard for loosening the surface of the soil; for clearing the soil of noxious weeds and for cutting the roots of such weeds below the top surface.

Another object is to make a hand-wielded, soil-shaving device which will shave the upper surface of the soil by drawing it along the under surface to thus provide an otherwise undisturbed mulch of the loosened soil, weeds, grass and leaves.

A further object is to make a tool of the character described, which will be efficient and inexpensive in cost of manufacture.

Other objects, advantages and benefits will become apparent to persons skilled in the art from a consideration of the following description and the annexed drawings forming a part hereof.

On the drawings:

Figure 1 is a plan view of the implement showing the handle broken off.

Figure 2 is a similar view of a modification showing the blade curved inwardly.

Figure 3 is a side elevation of Figures 1 and 2.

Figure 4 is a substantial end elevation of the implement shown in Figure 2.

Figure 5 is a fragment of a similar view showing a sharper bend and a relatively longer blade.

Figure 6 is a transverse section on the line VI—VI of Figure 3.

Figure 7 is a transverse section through the blade, at any point, taken on line VII—VII of Figure 4.

In all the views, the same reference characters indicate similar parts. The blade structure 10 is made of a relatively long thin and narrow strip of tempered steel having sharpened parallel marginal edges and of cross section throughout as shown in Figure 7 in which one side, 11, is flat and the other side, 12, is curved outwardly, or convex, forming a blade of ellipsoidal outline in cross section. This form extends to and includes the parallel shanks 13—13 which are integral parts of the metal strips. The curved side, where it meets the flat side, produces a keen sharp edge through the entire length of the strip. This form of strip is not only most excellently adapted for the purpose in forming the blade and the attaching shanks, but it also facilitates the mode of manufacture and reduces the cost thereof. The entire strip being of uniform and like cross section, the stock of which the implement is made may be rolled in long lengths and strips of length suitable for the formation of the metal parts of the implement may be cut therefrom.

The strip 10 may be sharpened at its edges throughout where the flat side 11 meets or bisects the curved side 12. The shank portions 15—15 are given a one half twist to reverse the sides to bring the curved sides 12—12 outside and the flat sides 11—11 inside along the parallel shank parts 13—13 which are transversely curved to form a socket.

A pair of rivets or bolts 19—19 pass through the shank members 13—13 and the handle 14 to hold the parts together. The curved parts 17—17 may be used to cut soil or weeds located in otherwise inaccessible places such as between the roots of trees or the like and the sharp bend 18 permits the use of a longer straight blade part 16.

The device is not a hoe in the sense that it is best adapted for chopping the soil or for digging. Its operation is more in the nature of a scraper and cultivator.

The blade portion may be curved inwardly, as shown in Figure 2, to produce a more or less shearing cutting edge, thereby to permit it to be operated with less effort or curved outwardly as shown in Figure 4, or straight as shown in Figure 1.

In using the instrument, it is to be drawn over the surface or just below the surface of the soil to loosen it and to cut away undesirable plant life such as weeds or the like. It will cut both ways, when being drawn toward the operator or pushed away from him.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A garden implement comprising a long narrow thin strip of metal, having a flat side and an outwardly curved, convex side, of uniform cross section throughout its entire length, said strip bent near its ends to form parallel shanks and twisted between said shanks and intermediate blade to bring the curved portion thereof on the outside of said shanks and said shanks transversely curved to form a rounding socket and said blade curved inwardly from its longitudinal axis to produce a curved, shearing, cutting edge thereof and a handle secured directly to said shanks.

2. A garden implement comprising a long narrow thin strip of metal having a flat side and a convex side and of uniform cross section thruout its entire length, said strip bent near its ends to form parallel shanks and twisted between said shanks and intermediate blade to bring the curved convex side thereof on the outside of said shanks and said shanks bent to form rounding socket members, said blade curved between said shanks into bow-shape form.

In testimony whereof I have hereunto subscribed my name.

GEORGE F. ARVEDSON.